INVENTOR
Norman C. Rendleman

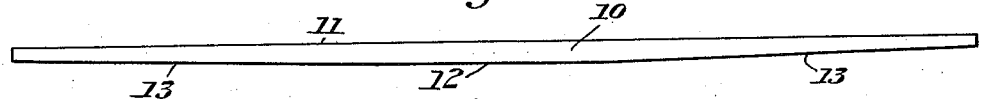
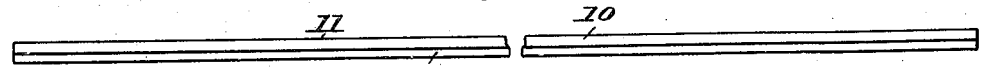
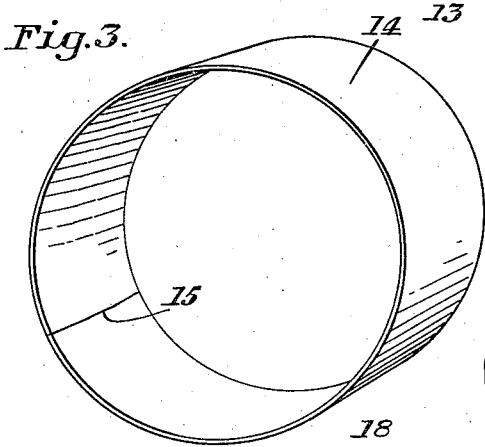
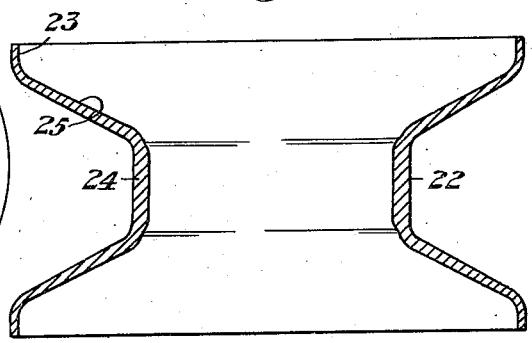
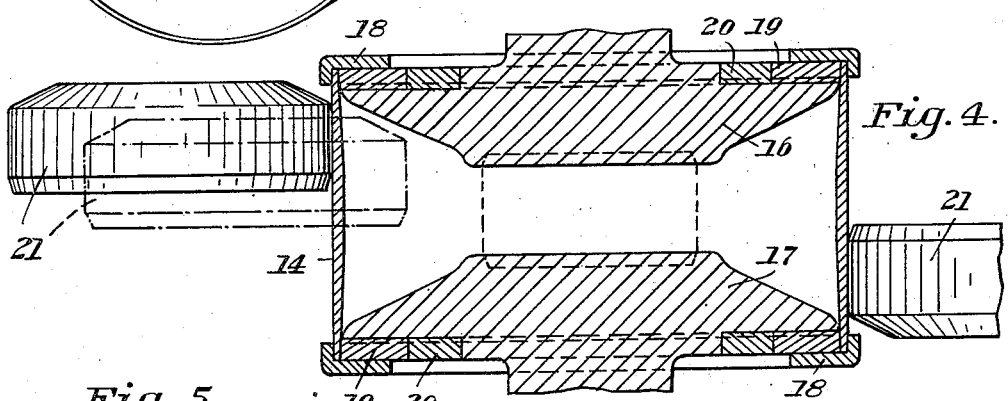
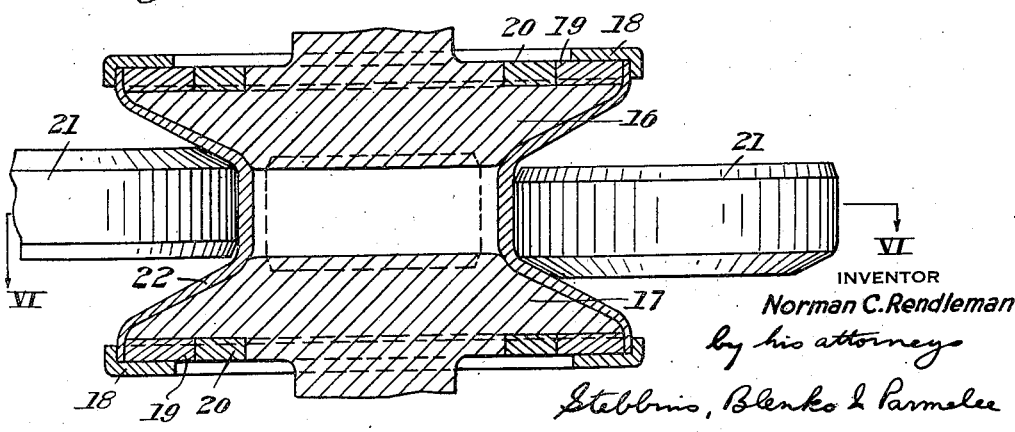

June 24, 1941.    N. C. RENDLEMAN    2,247,002
METHOD OF MAKING DISHED ARTICLES
Filed July 9, 1938    3 Sheets-Sheet 3

INVENTOR
Norman C. Rendleman
by his attorneys
Stebbins, Blenko & Parmelee

Patented June 24, 1941

2,247,002

UNITED STATES PATENT OFFICE 2,247,002

METHOD OF MAKING DISHED ARTICLES

Norman C. Rendleman, Pittsburgh, Pa., assignor to Jones & Laughlin Steel Corporation, a corporation of Pennsylvania Application July 9, 1938, Serial No. 218,455

3 Claims. (Cl. 29—159.01)

This invention relates to the manufacture of articles which I designate by the general term "dished."

The usual procedure in the manufacture of such articles heretofore has been to form them from flat stock by stamping or drawing operations. In the case of round articles, and the majority of dished articles are round, this involves an initial scrap loss of 25%, representing the difference between the area of a square piece of stock and that of the inscribed circle which is cut therefrom to form a blank. The principal object of my invention is to avoid this scrap loss and to improve generally upon the known methods for manufacturing dished articles.

In accordance with my invention, I form an annular blank, as by bending a flat bar into circular form and welding the ends together, and, while gripping one edge thereof, deform the portion spaced from the edge, preferably by hot rolling, to a position laterally displaced relatively to its original position. This method is particularly advantageous in making certain articles because it produces a thicker section adjacent the center by contracting and upsetting the material of the blank.

A complete understanding of the invention may be gained from the following detailed description and by referring to the accompanying drawings illustrating a preferred practice as well as one example of the articles which may be made thereby. In the drawings:

Figure 1 is an end view of a piece of flat stock which I employ in forming a blank for the manufacture of dished articles;

Figure 2 is a side elevation of the stock;

Figure 3 is a perspective view showing the formed blank ready for treatment in accordance with my invention;

Figure 4 is a view partly in section on a horizontal plane and partly diagrammatic illustrating the start of the first stage of the method of my invention;

Figure 5 is a view similar to Figure 4 showing the completion of the first stage;

Figure 7 is a sectional view taken axially through the blank after completion of the first stage of operation;

Figure 6:
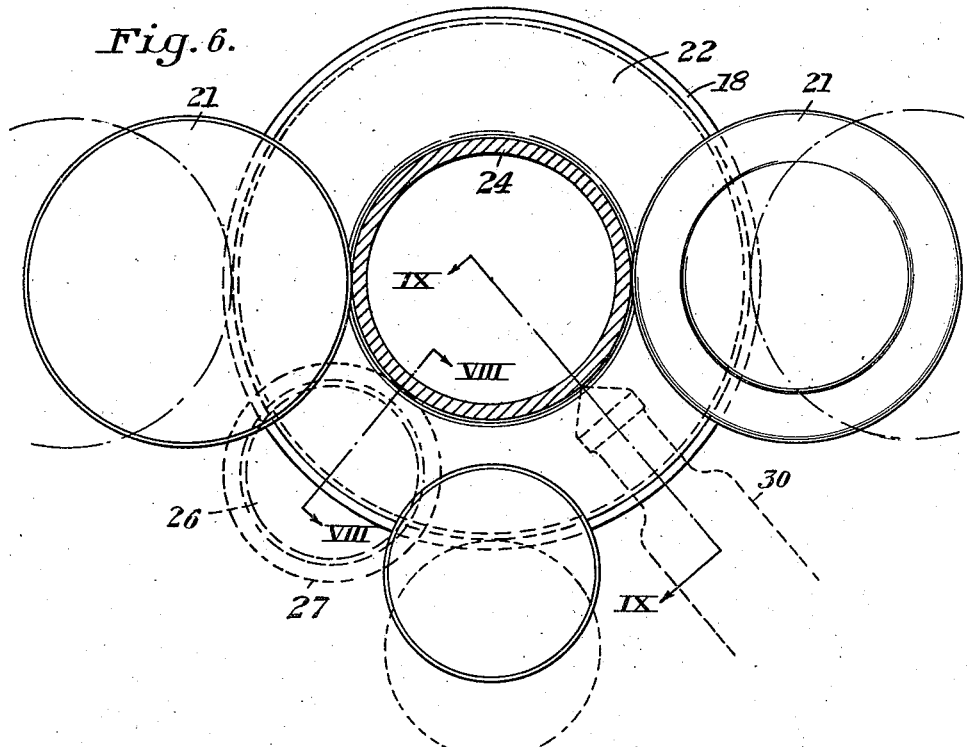
Figure 6 is a view largely diagrammatic and partly in section along the line VI—VI of Figure 5.

Referring now in detail to the drawings, I use as starting material, flat rolled stock in the form of a plate or bar 10. One side of the bar is a plane surface as shown in 11. The central portion 12 of the other side is parallel to the surface 11. The bar tapers outwardly from this portion, however, as indicated at 13, toward both edges. The shape of the stock is such that it may be easily and cheaply rolled.

Appropriate lengths of the stock 10 are bent to form a substantially cylindrical blank 14 and the abutting ends are joined by welding as indicated at 15. The completed blank 14 is heated to a suitable rolling temperature and is then placed on a pair of oppositely disposed rotatable forms 16 and 17 having substantially the shape of the desired finished article. The edges of the blank are clamped to the forms by any convenient means such as rings 18 and expanding segments 19 actuated by cam rings 20.

When the blank has been firmly secured to the forms, the latter are rotated and shaping rolls 21 are advanced toward the blank. The rolls 21 are freely rotatable and are advanced along a line parallel to the inclined surfaces of the forms, as indicated by dotted lines in Figure 4. I thus effect a shaping of the blank over the forms by rolling and upsetting. It will be understood that as the material of the blank is deformed inwardly toward the final position shown in Figure 5, the thickness of section increases because of the reduction in diameter.

The result of the initial operation is shown in Figures 5 and 7. The partly formed blank 22 there shown comprises substantially undeformed edges 23 having the thickness of the original material, an inner cylindrical portion 24 having a thickness greater than that of the original stock, and connecting conical portions 25 having a thickness tapering from that of the edges 23 to that of the cylindrical portions 24.

Figure 8:
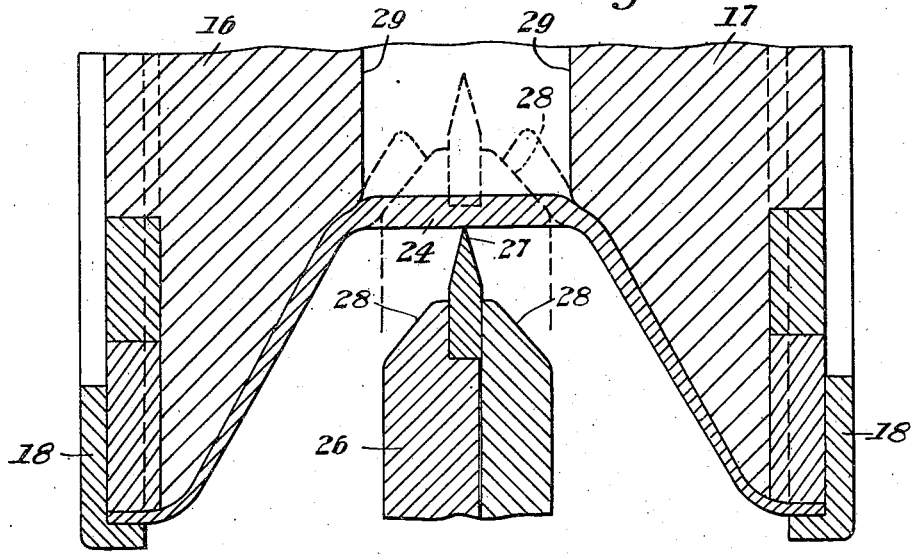
Figure 8 is a sectional view taken along the line VIII—VIII of Figure 6 illustrating the commencement of the second stage of operations.

When the blank has been deformed to the shape shown in Figures 5 and 7, the rolls 21 are withdrawn and a cutting tool 26 in the form of a rotatable disk with a cutting edge 27 thereon is advanced toward the blank along a medial plane as shown in Figure 8. The edge 27 of the tool 26 rapidly cuts the blank in two. The tool is also provided with conical faces 28 which, when advanced to the position shown in dotted lines in Figure 8 deform the halves of the center portion 24 of the blank inwardly toward the flat faces of the forms 16 indicated at 29. After this severing and partial bending has been accomplished the tool 26 is withdrawn.

Figure 9:
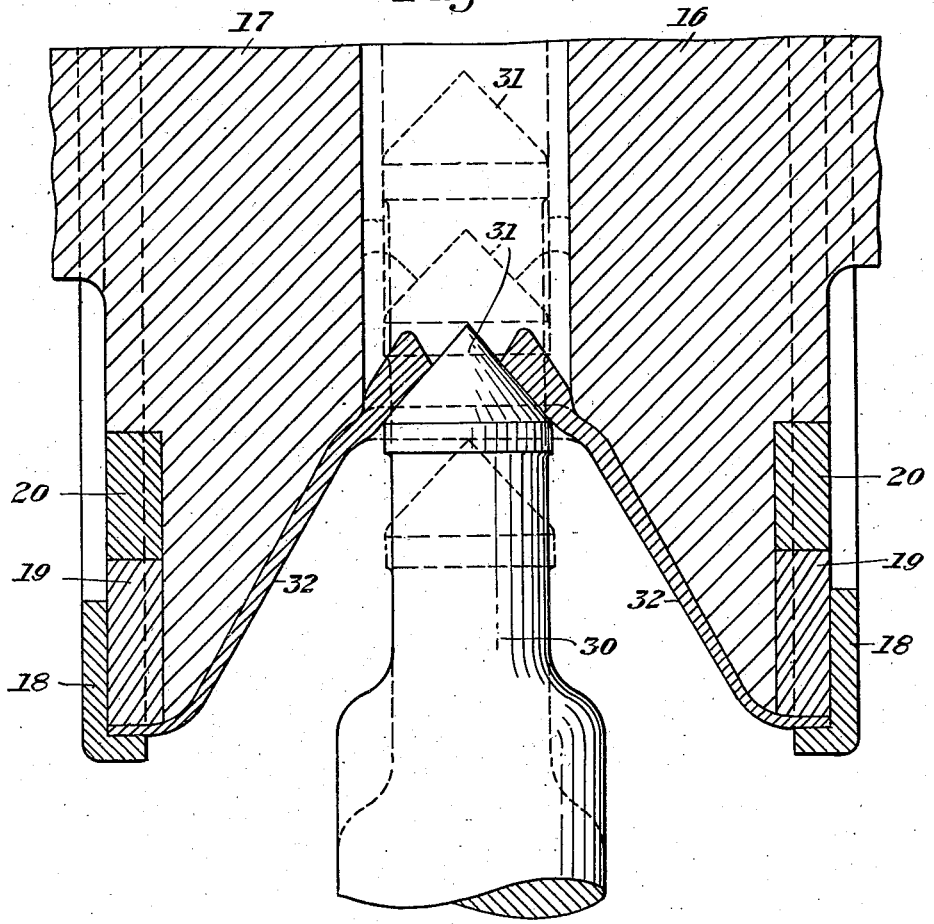
Figure 9 is a sectional view taken along the line IX—IX of Figure 6 illustrating the commencement of the third stage of operations.
Figure 10:
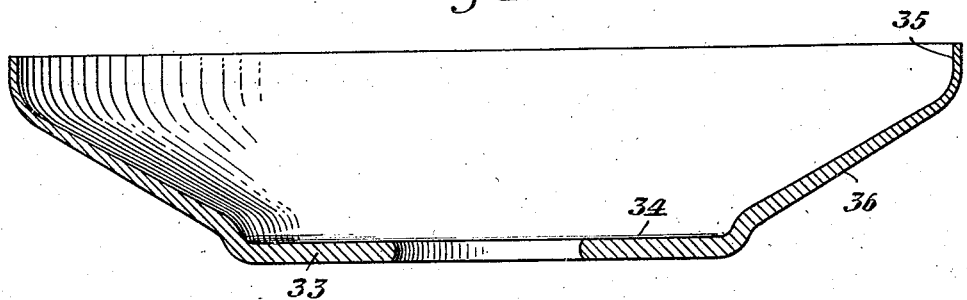
Figure 10 is a sectional view taken axially through one form of article produced by my method.

The final step of the process is accomplished by a roll 30 having a conical end 31. After severance of the blank in two parts and withdrawal of tool 26, the forms 16 and 17 are driven in opposite directions and the roll 30 advanced as indicated in Figure 9. By a progressive rolling and upsetting action, the roll 30 effects a flattening and thickening of the inner edges of the two semi-finished blanks indicated at 32, as the roll 30 advances toward the axis of rotation of the forms and blanks. This progressive thickening and flattening results in the production of a finished article such as that shown at 33. The article illustrated happens to be a wheel disk which requires only the formation of the usual bolt holes after completion of the operations described and removal of the finished blanks from the forms. The finished disk has a thick center hub portion 34, a thin peripheral rim 35 and a tapering web 36 connecting the hub portion and rim. The hub portion 34 is provided with bolt holes for attachment to the brake drum while the rim 35 is adapted to be riveted to the wheel rim.

It will be apparent from the foregoing description that the invention provides a dished article and method for manufacture thereof which are highly superior to such articles and the methods known heretofore. By this method, the flat stock which can be cheaply produced is rapidly converted by a series of simple steps into the desired final form with a minimum of waste by way of scrap loss or otherwise. The several forming operations can conveniently be performed quickly enough to permit the entire shaping operation to be completed without necessitating reheating the blank.

A further advantage of the invention is that the fibers of the metal in the finished article extend circumferentially thereof. In dished articles made by the previous method, the grain or fiber of the material is diametrical and, since the properties of rolled stock are not the same in the direction of rolling and at right angles thereto, the finished articles produced by such methods are not entirely symmetrical so far as strength is concerned. According to the present invention, any defects from the parent ingot which carry over into the stock 19 are disposed in the medial plane along which the semi-finished blanks are severed. As a result, no plane of weakness exists in the finished articles as is frequently the case due to imperfect ingots.

Although I have illustrated and described herein but a preferred practice of the method and one form of article which can be made thereby, it will be apparent that changes may be made in the procedure described and that other dished articles, for example harrow disks and the like, can be produced without departing from the spirit of the invention or the scope of the appended claims.

I claim:

1. In a method of hot-rolling dished articles, the steps including forming a substantially cylindrical blank from a metal plate, heating the blank to a temperature suitable for rolling, supporting the heated blank at its ends on a pair of opposed, frusto-conical forms, rotating the blank and rolling the mid-portion of the blank inwardly to form a pair of frusto-conical portions, connected by a substantially cylindrical mid-portion, severing the blank along a median plane through said cylindrical mid-portion, rolling down the severed parts of said mid-portion to form flanges extending inwardly from said frusto-conical portions.

2. In a method of hot-rolling dished articles, the steps including forming a substantially cylindrical blank from a metal plate, heating the blank to a temperature suitable for rolling, supporting the blank at its ends on a pair of opposed, frusto-conical forms, rotating the blank and rolling the mid-portion of the heated blank inwardly to form a pair of frusto-conical portions, connected by a substantially cylindrical mid-portion, severing the blank along a median plane through said cylindrical mid-portion, and then deforming the parts of said mid-portion inwardly of said frusto-conical portions.

3. In a method of hot-rolling dished articles, the steps including forming a substantially cylindrical blank from a metal plate, heating the blank to a temperature suitable for rolling, supporting the blank at its ends on a pair of opposed, frusto-conical forms, rotating the blank and rolling the mid-portion of the heated blank inwardly to form a pair of frusto-conical portions connected by a substantially cylindrical mid-portion, severing the blank along a median plane through said cylindrical mid-portion, and then deforming the parts of said mid-portion inwardly of said frusto-conical portions, while retaining the shape of the frusto-conical portions.

NORMAN C. RENDLEMAN.